(12) United States Patent
Edelmann et al.

(10) Patent No.: US 8,188,266 B2
(45) Date of Patent: May 29, 2012

(54) CELLULOSE- OR LIGNOCELLULOSE-CONTAINING COMPOSITE MATERIALS BASED ON A SILANE-BASED COMPOSITE AS A BINDER

(75) Inventors: Roland Edelmann, Rheinfelden (DE); Burkhard Standke, Loerrach (DE); Peter Jenkner, Wesel (DE); Alireza Kharazipour, Goettingen (DE); Lars Kloeser, Goettingen (DE); Jaroslaw Monkiewicz, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 772 days.

(21) Appl. No.: 11/995,550

(22) PCT Filed: Jun. 14, 2006

(86) PCT No.: PCT/EP2006/063206
§ 371 (c)(1),
(2), (4) Date: Jan. 14, 2008

(87) PCT Pub. No.: WO2007/023009
PCT Pub. Date: Mar. 1, 2007

(65) Prior Publication Data
US 2008/0221318 A1    Sep. 11, 2008

(30) Foreign Application Priority Data

Aug. 26, 2005 (DE) .......................... 10 2005 040 683
Feb. 14, 2006 (DE) .......................... 10 2006 006 655

(51) Int. Cl.
*C08B 1/00* (2006.01)
*C08B 15/10* (2006.01)
*C07H 1/00* (2006.01)
*A61K 31/717* (2006.01)

(52) U.S. Cl. .............................. 536/56; 536/124; 514/57
(58) Field of Classification Search .................... 536/56, 536/124; 514/57
See application file for complete search history.

(56) References Cited

U.S. PATENT DOCUMENTS

| | | | |
|---|---|---|---|
| 5,629,400 A | 5/1997 | Standke et al. |
| 5,679,147 A | 10/1997 | Standke et al. |
| 5,808,125 A | 9/1998 | Standke et al. |
| 5,849,942 A | 12/1998 | Standke et al. |
| 5,863,509 A | 1/1999 | Standke et al. |
| 5,885,341 A | 3/1999 | Standke et al. |
| 6,054,601 A | 4/2000 | Standke et al. |
| 6,176,918 B1 | 1/2001 | Glausch et al. |
| 6,177,582 B1 | 1/2001 | Jenkner et al. |
| 6,187,426 B1 | 2/2001 | Jonschker et al. |
| 6,228,936 B1 | 5/2001 | Standke et al. |
| 6,239,194 B1 | 5/2001 | Standke et al. |
| 6,251,989 B1 | 6/2001 | Edelmann et al. |
| 6,255,513 B1 | 7/2001 | Standke et al. |
| 6,288,256 B1 | 9/2001 | Standke et al. |
| 6,361,871 B1 | 3/2002 | Jenkner et al. |
| 6,395,858 B1 | 5/2002 | Mack et al. |
| 6,403,228 B1 | 6/2002 | Mack et al. |
| 6,491,838 B1 | 12/2002 | Standke et al. |
| 6,500,883 B1 | 12/2002 | Mack et al. |
| 6,534,667 B1 | 3/2003 | Standke et al. |
| 6,620,514 B1 | 9/2003 | Arpac et al. |
| 6,641,870 B2 | 11/2003 | Bartkowiak et al. |
| 6,663,683 B2 | 12/2003 | Lortz et al. |
| 6,676,719 B2 | 1/2004 | Lortz et al. |
| 6,685,766 B2 | 2/2004 | Standke et al. |
| 6,695,904 B2 | 2/2004 | Burger et al. |
| 6,713,186 B1 | 3/2004 | Jenkner et al. |
| 6,767,377 B2 | 7/2004 | Schumacher et al. |
| 6,770,327 B2 | 8/2004 | Edelmann et al. |
| 6,773,697 B2 | 8/2004 | Hemme et al. |
| 6,773,814 B2 | 8/2004 | Schumacher et al. |
| 6,808,769 B2 | 10/2004 | Batz-Sohn et al. |
| 6,841,197 B2 | 1/2005 | Standke et al. |
| 6,905,632 B2 | 6/2005 | Lortz et al. |
| 6,991,190 B2 | 1/2006 | Lortz et al. |
| 7,015,270 B2 | 3/2006 | Scharfe et al. |
| 7,026,398 B2 | 4/2006 | Monkiewicz et al. |
| 7,083,769 B2 | 8/2006 | Moerters et al. |
| 7,244,302 B2 | 7/2007 | Schumacher et al. |
| 7,255,735 B2 | 8/2007 | Meyer et al. |
| 7,374,787 B2 | 5/2008 | Lortz et al. |
| 7,399,487 B2 | 7/2008 | Batz-Sohn et al. |
| 7,427,442 B2 | 9/2008 | Albert et al. |

(Continued)

FOREIGN PATENT DOCUMENTS

DE          4343817 A1  *  6/1995

(Continued)

OTHER PUBLICATIONS

U.S. Appl. No. 12/159,785, filed Jul. 1, 2008, Standke, et al.
U.S. Appl. No. 12/181,629, filed Sep. 4, 2008, Militz, et al.
U.S. Appl. No. 13/257,488, filed Oct. 21, 2011, Standke, et al.
U.S. Appl. No. 13/256,557, filed Sep. 14, 2011, Scharfe, et al.
U.S. Appl. No. 12/673,390, filed Feb. 16, 2010, Wassmer, et al.
U.S. Appl. No. 12/674,271, filed Feb. 19, 2010, Albert, et al.
U.S. Appl. No. 12/674,601, filed Feb. 22, 2010, Jenkner, et al.

*Primary Examiner* — Shaojia Anna Jiang
*Assistant Examiner* — Everett White
(74) *Attorney, Agent, or Firm* — Oblon, Spivak, McClelland, Maier & Neustadt, L.L.P.

(57) ABSTRACT

The present invention relates to a composite material based on (a) a cellulose- or lignocellulose-containing material and (b) a composite as a binder, the composite resulting from the reaction of at least the components (i) a glycidyloxypropylalkoxysilane, (ii) an aqueous silica sol having a solids content of >20% by weight, (iii) an organic acid as a hydrolysis catalyst and (iv) n-propyl zirconate, butyl titanate or titanium acetylacetonate as a crosslinking agent. The present invention furthermore relates to a process for the production of said composite materials and the use of a composite (b) as a binder for the production of wood-based materials.

23 Claims, No Drawings

U.S. PATENT DOCUMENTS

| | | | |
|---|---|---|---|
| 7,470,423 B2 | 12/2008 | Lortz et al. | |
| 7,538,142 B2 | 5/2009 | Lortz et al. | |
| 7,572,854 B2 | 8/2009 | Schneider et al. | |
| 7,578,877 B2 | 8/2009 | Giessler et al. | |
| 7,598,409 B2 | 10/2009 | Just et al. | |
| 7,611,753 B2 | 11/2009 | Bartkowiak et al. | |
| 7,615,577 B2 | 11/2009 | Lortz et al. | |
| 7,645,335 B2 | 1/2010 | Lortz et al. | |
| 7,666,257 B2 | 2/2010 | Giessler-Blank et al. | |
| 7,670,422 B2 | 3/2010 | Giessler-Blank et al. | |
| 7,749,322 B2 | 7/2010 | Schumacher et al. | |
| 7,780,777 B2 | 8/2010 | Perlet et al. | |
| 7,815,936 B2 | 10/2010 | Hasenzahl et al. | |
| 7,834,073 B2 | 11/2010 | Standke et al. | |
| 7,976,719 B2 | 7/2011 | Batz-Sohn et al. | |
| 8,012,367 B2 | 9/2011 | Hasenzahl et al. | |
| 2002/0197311 A1 | 12/2002 | Hasenzahl et al. | |
| 2003/0049428 A1* | 3/2003 | Ryan | 428/292.1 |
| 2003/0108580 A1 | 6/2003 | Hasenzahl et al. | |
| 2003/0228271 A1 | 12/2003 | Batz-Sohn et al. | |
| 2004/0240062 A1 | 12/2004 | Lortz et al. | |
| 2005/0169861 A1 | 8/2005 | Lortz et al. | |
| 2005/0265934 A1 | 12/2005 | Schumacher et al. | |
| 2006/0104881 A1 | 5/2006 | Lortz et al. | |
| 2006/0159635 A1 | 7/2006 | Meyer et al. | |
| 2006/0159636 A1 | 7/2006 | Meyer et al. | |
| 2006/0159637 A1 | 7/2006 | Meyer et al. | |
| 2006/0163533 A1 | 7/2006 | Batz-Sohn et al. | |
| 2006/0229210 A1 | 10/2006 | Neugebauer et al. | |
| 2006/0292192 A1 | 12/2006 | Hasenzahl et al. | |
| 2007/0054056 A1 | 3/2007 | Albert et al. | |
| 2007/0110906 A1 | 5/2007 | Edelmann et al. | |
| 2007/0231280 A1 | 10/2007 | Schumacher et al. | |
| 2007/0297998 A1 | 12/2007 | Meyer et al. | |
| 2008/0027161 A1 | 1/2008 | Schlosser et al. | |
| 2008/0058489 A1 | 3/2008 | Edelmann et al. | |
| 2008/0095724 A1 | 4/2008 | Hasenzahl et al. | |
| 2008/0187673 A1 | 8/2008 | Standke et al. | |
| 2008/0188617 A1 | 8/2008 | Standke et al. | |
| 2008/0213325 A1 | 9/2008 | Schumacher et al. | |
| 2008/0249237 A1 | 10/2008 | Hager et al. | |
| 2008/0264299 A1 | 10/2008 | Lortz et al. | |
| 2009/0047225 A1 | 2/2009 | Hasenzahl et al. | |
| 2009/0069464 A1 | 3/2009 | Standke | |
| 2009/0131694 A1 | 5/2009 | Schumacher et al. | |
| 2009/0186053 A1 | 7/2009 | Meyer et al. | |
| 2009/0261309 A1 | 10/2009 | Lortz et al. | |
| 2010/0117021 A1 | 5/2010 | Batz-Sohn et al. | |
| 2010/0119851 A1 | 5/2010 | Giessler-Blank et al. | |
| 2010/0159144 A1 | 6/2010 | Standke et al. | |
| 2010/0209339 A1 | 8/2010 | Schumacher et al. | |
| 2010/0209719 A1 | 8/2010 | Borup et al. | |
| 2010/0233392 A1 | 9/2010 | Batz-Sohn et al. | |
| 2010/0308287 A1 | 12/2010 | Lortz et al. | |
| 2011/0144226 A1 | 6/2011 | Spyrou et al. | |

FOREIGN PATENT DOCUMENTS

| | | |
|---|---|---|
| DE | 100 37 724 A1 | 2/2002 |
| EP | 0 613 905 A1 | 9/1994 |
| EP | 0 613 906 A1 | 9/1994 |
| WO | WO 98/22536 | 5/1998 |
| WO | WO 2006/010388 A1 * | 2/2006 |

* cited by examiner

CELLULOSE- OR LIGNOCELLULOSE-CONTAINING COMPOSITE MATERIALS BASED ON A SILANE-BASED COMPOSITE AS A BINDER

The present invention relates to composite materials based on cellulose- or lignocellulose-containing materials and organosilicon compounds as a binder, a process for the production thereof and the use of special organosilicon compounds or a solution thereof.

Organosilicon compounds are used in the form of various silanes, their reaction products or corresponding formulations in the production of composite materials in particular those based on natural or near-natural fibers, i.e. cellulose- or lignocellulose-containing materials.

Wood-based materials comprise up to about 20% of binder and other additives. The most frequently used binder worldwide for wood-based materials is urea-formaldehyde resin (UF resin).

However, formaldehyde resin-bound wood-based materials have a continuous formaldehyde emission which, in spite of compliance with guidelines (EN 120 and DIBt guideline 100, class E1=0.1 ppm), appears problematic from the point of view of consumer protection since many studies have shown that formaldehyde not only affects the central nervous system but can also cause carcinomas. Very recently, there have been increased demands for a further reduction in the permissible formaldehyde concentrations.

Furthermore, wood-based materials glued with UF resin have a comparatively low heat and moisture resistance which prevents use for most special areas, for example for load-bearing and high-strength purposes and for the outdoor sector.

In addition to UF resins, about 10% of phenol-formaldehyde resin (PF resin) is also used for the production of wood-based materials.

Organic isocyanates are used in a small proportion in the wood-based materials industry for materials having good mechanical and water-resistant properties. Diphenylmethane diisocyanate (PMDI) is mainly used. In contrast to the systems described before, the isocyanates form chemical compounds with the wood, demonstrably with lignin and cellulose.

However, the use of PMDI as a binder has a large number of disadvantages. In its regard to application technology, the affinity to metal is a cause for complaint since PMDI-glued particles and fibers can adhere to the press belts during the hot-pressing. For this reason, it is necessary to work with expensive, specially coated press belts.

Moreover, stringent work safety measures have to be provided and complied with when handling PMDI.

Binders or binder systems for natural or near-natural wood-based materials, such as, for example, potato pulp (EP 0 613 906 A1, DE 43 06 441 A1, DE 43 40 517 A1, DE 434 518 A1), do not ensure an effect in compliance with standards for every application (in this context, cf. also "Enzyme von Weißfäul-epilzen als Grundlage für die Herstellung von Bindemitteln für Holzwerkstoffe [Enzymes of white-rot fungi as a basis for the preparation of binders for wood-based materials]" by A. R. Kharazipour, vol. 121, J D. Sauerländers Verlag, Frankfurt am Main, ISBM 3-7939-5124-3).

DE 100 37 724 A1 discloses a process for the production of composite materials from organic substances using a binder based on hydrogen-, alkyl-, alkenyl-, phenyl-, glycidyloxy-alkyl-, acryloyloxyalkyl- and methacryloyloxyalkyl-functional siloxanes.

DE 196 47 369 A1 relates to composite materials based on glass fibers, mineral fibers or wood-based materials, the binder used being a so-called nanocomposite which is prepared by the sol-gel process and is based, inter alia, on colloidal inorganic particles and one or more hydrolyzable organosilanes. The silanes used may carry chloride, alkoxy, acetoxy, alkyl, alkenyl, aryl, glycidyloxyalkyl and methacryloyloxyalkyl groups as functional groups.

Furthermore, WO 98/22536 discloses composite materials based on plant materials, where, over and above the recommendation of DE 196 47 369 A1 for the polysiloxane of the sol-gel system, alkynyl, alkacryloyl and arylalkylene groups which optionally may also have one or more substituents, such as halogen, alkoxy, hydroxyl, amino or epoxide groups, are mentioned as possible radicals which cannot be hydrolytically eliminated, in addition to alkyl and alkenyl groups. Furthermore, according to WO 98/22536, pure methyltriethoxysilane or a mixture of methyltriethoxysilane and tetraethoxysilane can be used as a binder for the production of a composite material.

A substantial disadvantage of the abovementioned system is that hydrolyzable alkoxides are also used. These have a vapor pressure which is not negligible and moreover eliminate alcohol as a hydrolysis product. This leads in practice on the processing machines customary in particle board work to a considerable odor and to a hazard due to explosive vapors.

EP 0 716 127 B1 and EP 0 716 128 B1 disclose water-based aminoalkyl-/alkyl/hydroxyl- or alkoxysiloxane containing compositions which are used, inter alia, for imparting water repellency to textiles, leather, cellulose products and starch products. Such aminoalkylorganohydroxysiloxanes soluble in water or water/alcohol mixtures are also referred to as hydrosil systems. Fluoroalkyl-functional hydrosil systems are disclosed, for example, in EP0 846 716 B1, EP0 846 717 B1 and EP1 101 787A2.

The German patent application 10 2004 037 045.1 relates to aqueous silane nanocomposites, these being used in the coating of substrate surfaces, such as those of paper, board, wood, pressboard, plastic, lacquer coats, stone, ceramic, metal or metal alloys.

The object of the present invention was to provide cellulose- or lignocellulose-containing composite materials which are based on a further binder.

The object is achieved, according to the invention, in accordance with the information of the patent claims.

Thus, it was surprisingly found that novel composite materials having substantially improved properties, based on (a) at least one cellulose- or lignocellulose-containing material and (b) a composite as a binder, the composite (also referred to below as nanocomposite or as binder for short) resulting from the reaction of at least the components (i) a glycidyloxypropylalkoxysilane,
(ii) an aqueous silica sol having a solids content of >20% by weight,
(iii) an organic acid as a hydrolysis catalyst and
(iv) n-propyl zirconate, butyl titanate or titanium acetylacetonate as a crosslinking agent, are obtainable in a simple and economical manner by
treating dried or moist cellulose- or lignocellulose-containing material with
a composite according to (b),
bringing the cellulose or lignocellulose material treated in this manner into a desired form and then hot-pressing it.

The present results showed that a composite according to (b) can now also be used as a binder for the production of composite materials.

Moreover, composite materials according to the invention can advantageously contain at least one further component (c), such as, for example, paraffin- or wax-based water repellants, flameproofing agents, e.g. polyphosphates, and biocidal substances and fragrances—to mention but a few.

Composite materials according to the invention are as a rule advantageously distinguished by a substantially improved transverse tensile strength compared with other comparable composite materials.

Moreover, in contrast to UF-, PF- or MF-glued composite materials, composite materials according to the invention emit no harmful formaldehyde vapors.

Furthermore, the production of composite materials glued according to the invention, in particular wood-based materials is possible with a substantially reduced processing risk and drastically reduced health-relevant risks compared with the PMDI-bound wood-based materials, properties of the products produced being identical or better.

The present invention therefore relates to composite materials based on (a) at least one cellulose- or lignocellulose-containing material and (b) a composite as a binder, the composite resulting from the reaction of at least the components
(i) a glycidyloxypropylalkoxysilane,
(ii) an aqueous silica sol having a solids content of >20% by weight,
(iii) an organic acid as a hydrolysis catalyst and
(iv) n-propyl zirconate, butyl titanate or titanium acetylacetonate as a crosslinking agent.

Composite materials according to the invention are advantageously characterized by a solids content of the composite (b) of from 0.04 to 15% by weight, preferably from 3 to 12% by weight, in particular from 4 to 9% by weight, based on the absolutely dry cellulose or lignocellulose material.

Composite materials according to the invention are preferably characterized by (a) at least one natural or near-natural cellulose- or lignocellulose-containing material from the series consisting of industrial wood, forestry industry timber, used or recycled wood, wood particles, woodchips, wood fibers, wood wool, wood dust, sawdust, planing chips, cutting chips, slabs, veneer wastes, splinters, particle materials from annual plants, e.g. cereal straw, rice straw, hemp shavings or cotton straw, or a mixture of at least two of the above mentioned materials.

Cellulose- or lignocellulose-containing fiber material advantageously originates from hardwood and softwood, palm fibers, e.g. coconut fibers, and annual plants, such as cereal straw, rice straw, cotton, jute and hemp—to list but a few.

Composites (b) used in the present invention are described in detail in German patent application 10 2004 037 045.1. The total content of the German patent application is hereby incorporated in the disclosure of the present application.

Thus, a composite (b) can be obtained by mixing at least (i) a glycidyloxypropylalkoxysilane, (ii) a colloidal, aqueous silica sol having a solids content of >20% by weight, preferably >30% by weight, (iii) an organic acid as a hydrolysis catalyst, in particular acetic acid, propionic acid or maleic acid, and (iv) zirconium tetrapropylate [also referred to as n-propyl zirconate: $Zr(O-C_3H_7)_4$], butyl titanate, in particular n-butyl titanate [$Ti(O-C_4H_9)_4$] or titanium acetylacetonate as a crosslinking agent. In addition, the alcohol hydrolysis product can be removed substantially, i.e. to an extent of from <5% by weight down to residual amounts in the region of the limit of detection, from such a hydrolysis product, in particular in the case of toxic methanol, and, if required, can be quantitatively replaced by water.

A composite (b) comprising a component (i) from the series consisting of 3-glycidyloxypropyltrimethoxysilane, 3-glycidyloxypropyltriethoxysilane, 3-glycidyloxypropyl methyldimethoxysilane, 3-glycidyloxypropylmethyldiethoxysilane or a mixture of at least two of the abovementioned silanes is preferably selected for composite materials according to the invention.

A generally cationic colloidal silica sol having a solids content of from >20 to 50% by weight, particularly preferably from 30 to 50% by weight, in particular from 40 to 50% by weight, i.e. about 45% by weight, is preferred as component (ii), the solids content being determined according to DIN EN ISO 3251. In particular, preferred aqueous silica sols have a pH of from 3 to 5, in particular from 3.5 to 4. However, it is also possible to use alkali-stabilized silica sol. The determination of the particle size distribution can be effected in the manner known per se by means of laser diffraction (Coulter LS particle size meter). Furthermore, in addition to amorphous, aqueous $SiO_2$ particles, silica sols used according to the invention may also contain further sol-gel-forming, aqueous element oxides, such as aluminum oxides or silicon/aluminum oxides. In addition, preferred silica sols contain as a rule amorphous, aqueous oxide particles having an average particle size of from 40 to 400 nm, for example—but not exclusively—Levasil 200 S/30% and Levasil 100 S/45%. The pH can be determined in a manner known per se, for example by means of pH paper or pH sticks.

Furthermore, an organic acid from the series consisting of acetic acid, propionic acid and maleic acid is preferred as component (iii). Thus, a composite (b) preferably contains from 0.01 to 3% by weight of component (iii), particularly preferably from 0.5 to 2% by weight, in particular from 1 to 2% by weight based on the composite.

The crosslinking agent according to component (iv) can be used as a powder or in alcoholic solution in the production of the composite. Composites used according to the invention are preferably based on a content of component (iv) of from 0.5 to 8% by weight, based on the composite (b).

A tetraalkoxysilane, in particular tetraethoxysilane, at least one alkylsilane, suitably an alkylalkoxysilane, in particular dimethyldiethoxysilane or methyltrimethoxysilane, and/or a phenyltrialkoxysilane, in particular phenyltriethoxysilane or phenyltrimethoxysilane, can also advantageously be used as further component (v) for binders (b) used according to the invention. Thus, a composite may contain component (v) in an amount of from 1 to 10% by weight, based on the composite. A proportion of component (ii) is suitably and correspondingly replaced by component (v).

Composites (b) used according to the invention are as a rule slightly turbid to opalescent liquids and may contain sol particles having a mean diameter of from 40 to 200 nm, preferably from 50 to 100 nm. The determination of the diameter of the sol particles can be effected in a manner known per se, for example by use of laser diffraction.

Said composites (b) have, as a rule, a solids content of from >40 to <60% by weight, preferably from 45 to 55% by weight, in particular from 45 to 50% by weight, based on the total composition. The solids content of binders present is suitably determined on the basis of DIN ISO 3251. Furthermore, the solids content and the viscosity of composites present can be adjusted by adding water. Advantageously, the addition of water is advantageously such that a solids content of about 50% by weight is present.

In addition, binders used according to the invention are distinguished by a comparatively low content of alcohol hydrolysis product of <5% by weight, preferably <3% by weight, based on the composite. The alcohol content in a composite can be determined, for example, by gas chromatography in a manner known per se.

The composite (b) may also contain a particularly suitable organic solvent, preferably ≦10% by weight of 1-methoxypropan-2-ol, in addition to or instead of water.

Thus, binders (b) present can also advantageously contain ≦10% by weight, preferably from 5 to 10% by weight, based on the composite, of 1-methoxypropan-2-ol. Such systems are also distinguished as a rule by a high flashpoint.

Binders used according to the invention have, as a calculation parameter, preferably a water content of from about 70 to 30% by weight, particularly preferably from 65 to 50% by weight, based on the composite. At a proportion of about 50% or more of water as solvent, as a rule the content of "nonvolatile fractions" is determined in such a binder. The determination is usually effected by evaporating the water and alcohol according to DIN EN ISO 3251—"Determination of the content of nonvolatile fractions". For this purpose, the binder is as a rule conditioned in a disposable aluminum dish for 1 hour at 125° C. and the content of nonvolatile fractions is determined by differential weighing. Relative values are determined by this method. Thus, in the case of a composite (b), a content of nonvolatile fractions of from 45 to 50% by weight is particularly preferred.

Furthermore, so-called hydrosil systems can be added to a nanocomposite (b) used according to the invention.

Here, hydrosil systems are understood as meaning substantially water-based, chloride-free, predominantly slightly acidic, aqueous system which contain a mixture of water-soluble, virtually completely hydrolyzed (fluoro)alkyl-/aminoalkyl-/hydroxyl- (or alkoxy-) siloxanes, as disclosed, for example, in EP 0 716 127 A, EP 0 716 128 A, EP 0 846 717 A, EP 1 031 593 A and EP 1 101 787 A. An addition of DYNASYLAN® F 8815 to a binder (b) present in the weight ratio of from 1:0.01 to 0.01:1, particularly preferably from about 1:0.1 to 0.1:1, is particularly advantageous, the aqueous DYNASYLAN® F 8815 used here preferably having an active substance content of <40% by weight, particularly preferably from 0.1 to 20% by weight, in particular from about 13 to 15% by weight, based on the composite and determined according to DIN EN ISO 3251, as described above. Composites obtained in this manner are advantageously distinguished on application by strongly hydrophobic and oleophobic properties (also referred to as "easy to clean") of the coating.

Water, methanol, ethanol and/or 1-methoxypropan-2-ol may be used as diluents in composites present.

Furthermore, a hydrosil, preferably one comprising a fluoro-functional active substance can be added to the binder or composite (b) present. In particular, a hydrosil concentrate in an amount of from 13 to 15% by weight, calculated as active substance and based on the subsequent binder composition, is added with thorough mixing.

The present invention furthermore relates to a composite material which is obtainable by
  bringing dried or moist cellulose- or lignocellulose-containing material (a)
  into contact with a composite (b),
  bringing the cellulose or lignocellulose material treated in this manner into a desired form and then hot-pressing it.

The so-called "absolutely dry wood mass" is determined as a rule by treating the cellulose- or lignocellulose-containing material at 103° C. to constant weight, cf. in this context DIN 53 183 and EN 322.

Moist cellulose- or lignocellulose-containing material, for example in the form of wood fibers, can have a wood moisture content (also referred to below as moisture content for short) of more than 100%, based on absolutely dry wood mass, after the industrial process of defibrating in the so-called refiner. For example, freshly felled trunks have a moisture content of from 120 to 160%, depending on the tree species.

In the production of medium density fiber boards (MDF) by the so-called "blow line" process, the fiber material used is as a rule not dried prior to application of glue but passes from the upstream defibration process in the still moist state directly into the blow line, in which the binder is added to the fibers. Only thereafter are the fibers dried in this state after application of glue. A moisture content from about 10 to 14% is preferably established and further processing to MDF is subsequently effected.

However, it is also possible to use already dried cellulose- or lignocellulose-containing material for production of composite materials.

Thus, for example in the production of MDF by the blender process, dried fibers, preferably those having a moisture content of from about 10 to 12%, are used. This material is as a rule subjected to application of glue in a mixer and then further processed to MDF. Here too the glue application step can be followed by an additional drying step, for example in a tubular dryer line.

In particle board production, the use of ready-dried particles, in particular those having a moisture content of from 2 to 5%, is furthermore preferred. The drying on this material used is predominantly effected in a tube-bundle or rotary dryer.

The present invention therefore also relates to a process for the production of a composite material according to the invention by
  treating dried or moist cellulose- or lignocellulose-containing material (a) with
  a composite according to (b),
  bringing the material treated in this manner into a desired form and then hot-pressing it.

When carrying out the process according to the invention, the cellulose- or lignocellulose-containing material (a) is preferably sprayed uniformly with the composite (b), preferably in a pneumatically or hydraulically initiated glue application apparatus.

Advantageously up to 15% by weight, preferably from 0.1 to 14% by weight, particularly preferably from 3 to 13% by weight, very particularly preferably from 5 to 12% by weight, of composite (b), based on absolutely dry cellulose or lignocellulose material, can be used.

Moreover, in addition to the components (a) and (b), at least one from the series consisting of the paraffins, waxes, flameproofing agents, dyes, pigments, biocidal substance and fragrances can be used as further component (c). A component (c) is advantageously used in an amount of up to 8% by weight, preferably from 0.01 to 7% by weight, based on absolutely dry cellulose or lignocellulose material.

For carrying out the process according to the invention, the apparatuses or plants known per se for the production of composite materials, in particular wood-based materials, can be used, such as, for example, continuously operating Contiroll plants from Siempelkamp, Binos, Dieffenbacher or Metso—to mention but a few examples.

Suitable methods for the treatment of cellulose- or lignocellulose-containing material with a binder are, for example, brushing, roll-coating, spraying, dipping, flooding, spraying, application of glue by the blowline method or application of glue in a mixer (blender method using apparatuses from, for example, Lödige, Drais or Binos).

The cellulose- or lignocellulose-containing material can particularly advantageously be sprayed with a component (b)

as a binder in a rotating drum (circulation process) preferably carried out at room temperature or with cooling at about 10° C.) by means of a glue application apparatus operated with compressed air, for example a glue application gun, which suitably has an operating pressure of from 0 to 4 bar abs. As a rule a material to which glue has been substantially uniformly applied is obtained in this manner.

In the process according to the invention the glue application can moreover advantageously be carried out on a pilot or industrial scale, but also in a trough mixer, plowshare mixer or blender mixer or by the blowline process.

Furthermore, in the process according to the invention, the cellulose or lignocellulose material treated in this manner at ambient temperature can advantageously be scattered to give a cake, i.e. in particular a particle cake or matt, combed, and pressed at a temperature of up to 250° C., preferably from 150 to 210° C., and a pressure of up to 9 $N/mm^2$, preferably from 4 to 7 $N/mm^2$, and for a time of up to 300 s per mm of the desired board thickness, preferably from 5 to 60 s/mm, particularly preferably from 8 to 40 s/mm.

However, other shaped articles, for example extrudates or cuboid parts or special shaped articles, can be produced from such a cake or from cellulose or lignocellulose material to which glue has been applied according to the invention.

However, it is furthermore possible for an existing cake or material to which glue has been applied first to be prepressed or precompacted, for example with a preliminary pressure of from 0.2 to 0.6 $N/mm^2$. In addition, material to which glue has been applied, in particular a cake, can be preheated before, during or after the prepressing, i.e. before the actual pressing, for example to 60 to 800. Such a thermal and/or mechanical pretreatment of the cake or of the material to which glue has been applied before the actual pressing step can advantageously contribute toward a substantial improvement in the subsequent product quality.

In addition, the shaped articles obtained in the shaping or pressing step can advantageously be subjected to a postconditioning or ageing. Thus, for example, boards can be subjected to storage in a stack. Frequency heating, for example by means of microwave technology, can additionally be carried out.

However, cooling is also possible, for example for from 20 to 30 minutes in a star cooling turner.

The postconditioning can additionally contribute to standardization or uniformity in the composite materials.

Thus, composite materials according to the invention are obtained after the cooling, in particular particle boards, fiberboards, ultralight fiberboards (ULF), light fiberboards (LBF), medium density fiberboards (MDF), high density fiberboards (HDF), OSB boards (oriented strand board=OSB), veneer boards, plywood boards, wood pellets, wood briquettes and industrial construction material comprising wood, so-called "engineered wood", such as laminated strand lumber (LSL), parallel strand lumber (PSL) and laminated veneer lumbar (LVL). Abovementioned composite materials suitably have a bulk density of from 150 to 1200 $kg/m^3$. The bulk density can be determined, for example, according to EN 323.

For obtaining the particle (cf. component (a)) three raw material varieties are used nowadays in different proportions. About 57% of the required timber raw material are provided by industrial wood residues. Timber wastes from the wood treatment and processing industry are referred to as industrial timber residues. These include sawdusts, planing chips, cutting chips and slabs, but also residual rolls from the veneer industry. About a further 23% of the timber raw materials are obtained from forestry industry timber. This is the classical raw material in the form of harvested trunks, which are processed in the particle board works to give woodchips or directly by means of long wood chippers to give particles. The third group of raw materials comprising used or recycled wood is about 20%. These are used products comprising solid wood, wood-based materials or composite materials having a predominant wood content of more than 50% by mass. In the works, particles having defined dimensions are produced from the various raw material varieties by means of knife ring chippers, long wood chippers and hammer mills. After the particle material is present, it is dried as a rule to a moisture content of from 1.5 to 3% in tube-bundles or tubular drum dryers. Screening and classification are then effected, the particle material being separated into top and middle layer particles and possible coarse particle material being separated off. The particles of the top and middle layer fraction can then be fed for glue application and pressed, for example, to give particle boards.

In industrial fiber production, industrial wood residues are generally also used as raw material, in addition to forestry timber. The previously debarked forestry timber is comminuted together with the industrial wood residues in a chipper to give woodchips. These woodchips are as a rule digested by the "Asplund process" in steam at from 160 to 180° C. under a pressure of from 8 to 12 bar. After this operation, the so-called plastification, the material enters a refiner. This consists of two counter rotating grinding discs between which the material is defibrated. A constant pressure of about 11 bar prevails in the refiner. Owing to the mild digestion conditions, the wood is subject to few chemical changes. This leads to a light color of the fiber thus provided and a high efficiency.

Lignocellulose is generally understood as meaning the matrix component which is formed by the three major chemical wood ingredients, cellulose, hemicellulose and lignin. The incorporation of lignin (incrustation with lignin) leads as a rule to lignification of the cell wall and hence to improved mechanical stability and strength of terrestrial plants. Lignocellulose for use in the wood-based materials industry is obtained predominantly in the form of fibers or particles. For example, lignocellulose fibers can be obtained from hardwoods and softwoods. Furthermore, some annual plants, such as cereal, flax or hemp, are also a suitable source for lignocellulose fibers.

Fibers can be obtained—as described above—by the Asplund process. There, the wood is first comminuted into woodchip and then digested at high temperatures and pressure and finally defibrated using a refiner (which consists of two counterrotating grinding discs) for obtaining the particles, as a rule wood in the form of woodchips is fed to so-called knife ring chippers and chipped therein to give particles having defined dimensions.

In the process according to the invention, at least one natural or near-natural cellulose or lignocellulose-containing material from the series consisting of industrial wood, forestry industry timber, used or recycled wood, wood particles, woodchips, wood fibers, for example from pinewood, wood wool, wood dust, particles, such as sawdusts, planing chips or cutting chips, slabs, veneer wastes, splinters, particle material from annual plants, e.g. cereal straw, rice straw, hemp shavings or cotton straw, or a mixture of at least two of the abovementioned materials can advantageously be used according to component (a).

In the process according to the invention, a cellulose- or lignocellulose-containing material from plants from the series consisting of hardwood, softwood, coconut, in particular coconut fibers, cotton, flax scrapings, hemp scrapings, bargasse, jute, sisal, reed, rice straw or sealed straw is particular preferably used.

In general, the present invention is carried out as follows:

Cellulose or lignocellulose-containing material (a) is treated with a composite according to (b). If appropriate, further components are added to the material thus obtained, and the latter is introduced into a mold and cured in a manner known per se. For example, the material thus obtained can be scattered on the surface of a hot press, combed and hot-pressed. During this procedure, the cellulose- or lignocellulose-containing material reacts with the binder present and water evaporates.

Composite materials according to the invention, in particular wood-based materials, comprising cellulose- or lignocellulose-containing material (a), can thus advantageously be produced using a composite (b) as a binder.

The present invention therefore also relates to the use of a composite (b) as a binder for the production of wood-based materials.

In particular, the present binders are used for the production of particle boards, fiberboards, ultralight fiberboards, light fiberboards, medium density fiberboards, high density fiberboards, OSB boards, veneer boards, plywood boards, wood pellets, wood briquettes, "engineered wood", insulating materials, plant pots, for example from red-rotting spruce wood, moldings, for example—but not exclusively—moldings for automotive interior trim.

The present invention shows that composites (b) are particularly suitable also as binders in the production of composite materials, in particular wood-based materials having good mechanical-technological properties. The production and use of these wood-based materials is moreover advantageously free of emissions which are harmful to health.

EXAMPLES

DYNASYLAN® VPS 4112-Bound One-Layer Particle Boards

The particles used for the production of the particle boards were taken from the belt weigher in an industrial particle board work after drying and immediately before application of glue. They are divided into top layer fraction and middle layer fraction as a result of the process. The binder was finely atomized by means of a glue application gun from WALTHER PILOT in a rotating glue application drum by means of compressed air (from 0.2 to 1.2 bar) and added to the particles.

Thereafter, the particles were scattered to give a particle board cake and were hot-pressed. In the case of 3-layer particle boards, 40% of top layer material were used for the outer layers and 60% of middle layer material for the inner layer. One-layer particle boards produced consisted of 100% of middle layer material.

6 mm thick one-layer particle board having a required bulk density of 750 kg/m$^3$ were produced from middle layer particles using the nanocomposite DYNASYLAN® VPS 4112 as a binder. In each case, 8.5% of DYNASYLAN® VPS 4112, based on absolutely dry particles, were applied as glue to the particle material. The particle boards were pressed at 210° C. and for a pressing time of 40 s/mm. The results of the material test are summarized in table 1.

TABLE 1

| Designation | Transverse tensile strength (N/mm$^2$) | Change of transverse tensile strength compared with EN 312-4 (0.45 N/mm$^2$) in % |
|---|---|---|
| VPS 4112 | 0.53 | +18 |

The particle boards of all test series were able to fulfill EN 312-4 (0.45 N/mm$^2$) and EN 312-5 (0.5 N/mm$^2$). Thus, it was shown that the composite DYNASYLAN® VPS 4112 according to component (b) is also advantageously suitable as the sole binder for particle boards.

The invention claimed is:

1. A composite material, comprising:
   (a) at least one cellulose- or lignocellulose-containing material, and
   (b) a composite as a binder, the composite resulting from the reaction of at least the components
   (i) a glycidyloxypropylalkoxysilane,
   (ii) an aqueous silica sol having a solids content of >20% by weight,
   (iii) an organic acid as a hydrolysis catalyst and
   (iv) n-propyl zirconate, butyl titanate or titanium acetylacetonate as a crosslinking agent, and
   wherein said composite material is obtained by
      treating dried or moist cellulose- or lignocellulose-containing material (a) with a composite according to (b), to obtain a treated cellulose or lignocellulose material;
      bringing the treated cellulose or lignocellulose material into a desired form, to obtain a formed material and then hot-pressing said formed material,
      wherein up to 15% by weight of composite (b), based on absolutely dry cellulose or lignocellulose material, are used, and
      wherein the treated cellulose or lignocellulose material is scattered to give a cake, combed, and pressed at a temperature of up to 250° C. and at a pressure of up to 9 N/mm$^2$ and for a time of up to 300 s per mm board thickness.

2. The composite material according to claim 1, comprising a solids content of the composite (b) of from 0.04 to 9% by weight, based on absolutely dry cellulose or lignocellulose material.

3. The composite material according to claim 1, comprising a component (i) for composite (b) from the series consisting of 3-glycidyloxypropyltrimethoxysilane, 3-glycidyloxypropyltriethoxysilane, 3-glycidyloxypropylmethyldimethoxysilane, 3-glycidyloxypropylmethyldiethoxysilane or a mixture of at least two of the abovementioned silanes.

4. The composite material according to claim 1, comprising a colloidal silica sol having a solids content of from >20 to 50% by weight as component (ii) for composite (b).

5. The composite material according to claim 1, comprising an organic acid from the series consisting of acetic acid, propionic acid and maleic acid as component (iii) for composite (b).

6. The composite material according to claim 1, comprising a content of component (iv) for composite (b) of from 0.5 to 8% by weight, based on the composition of the composite.

7. The composite material according to claim 1, comprising at least one tetraalkoxysilane, at least one alkylsilane and/or a phenyltrialkoxysilane as further component (v) for composite (b).

8. The composite material according to claim 1, comprising sol particles in the component (ii) for composite (b) which have a mean diameter of from 40 to 200 nm.

9. The composite material according to claim 1, comprising a solids content of from >40 to <60% by weight in the component (ii) for composite (b), based on the total composition of the composite.

10. The composite material according to claim 1, comprising a content of alcohol hydrolysis product in the composite (b) of <5% by weight, based on the total composition of the composite.

11. The composite material according to claim 1, comprising a content of 1-methoxypropan-2-ol in the composite (b) of ≦10% by weight, based on the total composition of the composite.

12. The composite material according to claim 1, comprising a water content in the composite (b) of from about 70 to 30% by weight, based on the total composition of the composite.

13. The composite material according to claim 1, comprising a content of at least one surfactant in the composite (b).

14. The composite material according to claim 1, comprising an addition of a hydrosil system to the composite (b) in the weight ratio of from 1:0.01 to 0.01:1.

15. The composite material according to claim 14, wherein the hydrosil system has an active substance content of <40% by weight of said siloxanes.

16. The composite material according to claim 1, comprising
(a) at least one natural or near-natural cellulose- or lignocellulose-containing material from the series consisting of industrial wood, forestry industry timber, used or recycled wood, wood particles, woodchips, wood fibers, wood wool, wood dust, sawdusts, planing chips, cutting chips, slabs, veneer wastes, splinters, particle material from annual plant or a mixture of at least two of the abovementioned materials.

17. The composite material according to claim 1, a cellulose- or lignocellulose-containing fiber material originating from hardwood, softwood, palm fibers and annual plants.

18. The composite material according to claim 1, comprising at least one further component (c) from the series of the paraffin- or wax-based water repellants, flameproofing agents, dyes, biocidal substances and fragrances.

19. A process for the production of a composite material according to claim 1, comprising:
treating dried or moist cellulose- or lignocellulose-containing material (a) with a composite according to (b) to obtain a treated cellulose- or lignocellulose-containing material, and
bringing the treated cellulose- or lignocellulose-containing material into a desired form to obtain a formed material and then hot-pressing the formed material;
wherein up to 15% by weight of composite (b), based on absolutely dry cellulose or lignocellulose material, are used; and
wherein the treated cellulose or lignocellulose material is scattered to give a cake, combed, and pressed at a temperature of up to 250° C. and at a pressure of up to 9 N/mm$^2$ and for a time of up to 300 s per mm board thickness.

20. The process according to claim 19, wherein the cellulose- or lignocellulose-containing material (a) is sprayed with the composite (b) in a rotating drum by means of a glue application apparatus operated with compressed air.

21. The process according to claim 19, wherein, in addition to the components (a) and (b) a wax in an amount of up to 8% by weight, based on absolutely dry cellulose or lignocellulose material, is used as further component (c).

22. The process according to claim 19, wherein treated cellulose or lignocellulose material is thermally and/or mechanically pretreated before the pressing step.

23. The process according to claim 19, wherein shaped articles obtained in the pressing step are postconditioned.

\* \* \* \* \*